(No Model.)
W. B. UPTON.
CABLE TAKE-UP.
No. 471,446. Patented Mar. 22, 1892.
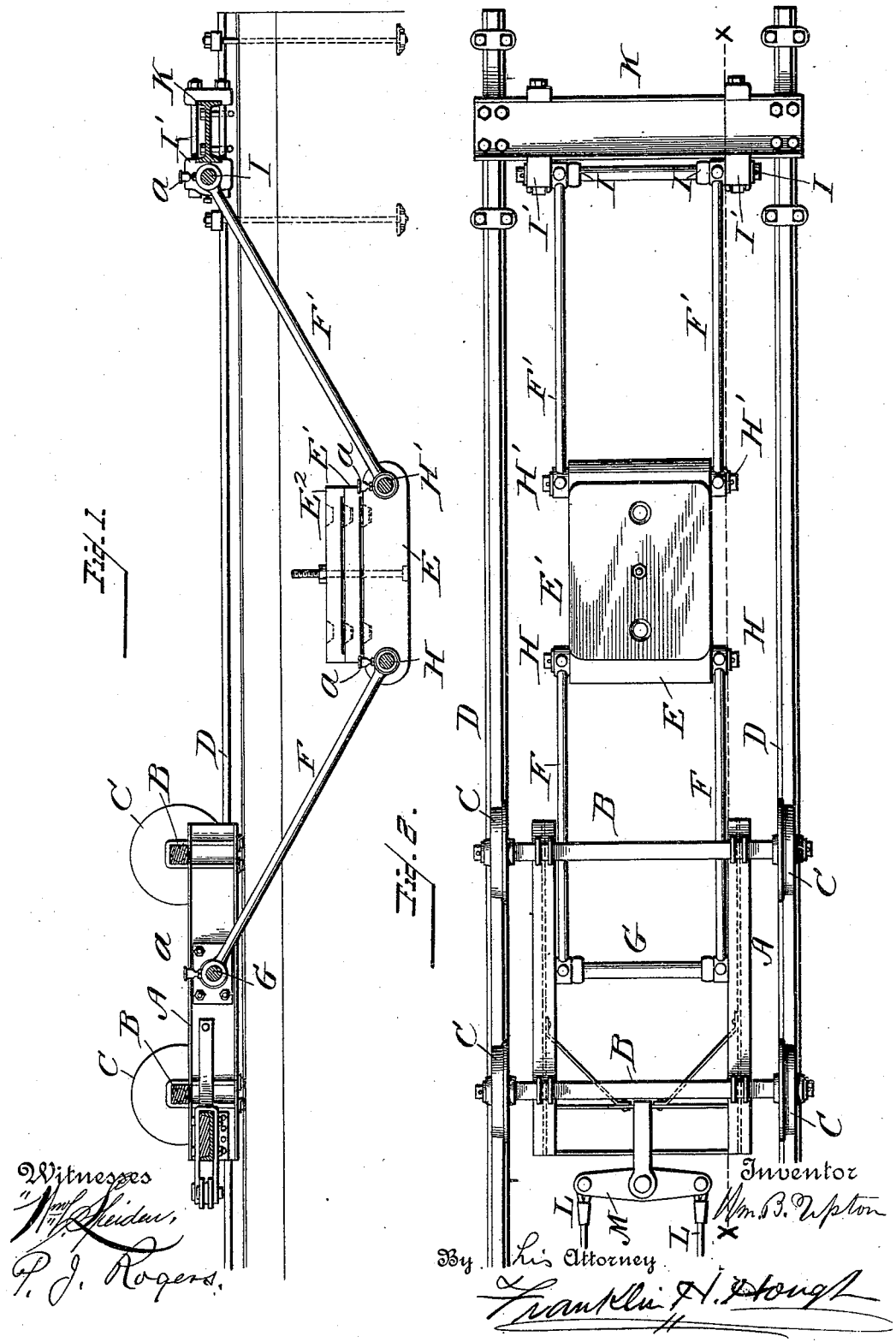

UNITED STATES PATENT OFFICE.

WILLIAM B. UPTON, OF KANSAS CITY, MISSOURI.

CABLE TAKE-UP.

SPECIFICATION forming part of Letters Patent No. 471,446, dated March 22, 1892.

Application filed September 11, 1891. Serial No. 405,415. (No model.)

*To all whom it may concern:*

Be it known that I, WILLIAM B. UPTON, a citizen of the United States, residing at Kansas City, in the county of Jackson and State of Missouri, have invented certain new and useful Improvements in Devices for Regulating the Tension of Cables in Cable Railways; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in mechanism for use in automatically maintaining an equalized tension upon the cable used in cable-railway systems.

The invention has for its object to provide an improved apparatus of the character described in which provision is had, through the medium of a weight suspended and controlled in its movements by a system of levers and a movable car or truck interposed between the take-up mechanism and the weight, for imparting a perfectly gradual increase or decrease of strain to the cable, as circumstances may require. The arrangement of the weight is such that, the lever connections working upon the principle of what is commonly known as the "toggle-joint," the weight, while constant, may range from an exceedingly-limited amount to an unlimited amount, the weight increasing with great rapidity as the weight is raised to the highest point and as rapidly decreasing as the weight is lowered.

The invention has for a further object to simplify and cheapen the construction of this class of appliances and to dispense entirely with the use of pits or wells which have heretofore been required.

As is generally known among those skilled in the art of cable railway construction and operation, the cable is subject to frequent and great fluctuations in tension, caused principally by the sudden taking hold upon the cable of the grips along the line of the road, thus taking up a quantity of slack in advance of the grip. This slack is at once thrown back upon the tension-carriage or take-up at the power-house, thus causing the said carriage to move backward, the carriage moving forward again when the cable is paying out more rapidly than it is running upon the line. If not controlled or eased off at the termination of the forward movement of the tension-carriage, a severe jerk or pull will be imparted to the cable, which will be imparted to the several cars upon the line. By my weight and system of leverage connected therewith, which will be presently explained in detail, this jerking tendency is entirely obviated, the weight being gradually applied, tending to equalize these strains upon the cable.

The invention is clearly illustrated in the accompanying drawings, which, with the letters of reference marked thereon, form a part of this specification, like letters of reference indicating like parts throughout the several views, and in which drawings—

Figure 1 is a vertical longitudinal section through a tension-regulating device embodying my improvements, the same being taken upon line $x$ $x$ of Fig. 2. Fig. 2 is a top plan view of the device.

Reference now being had to the details of the drawings by letter, A represents a car or truck consisting of a substantial rectangular frame having axles B and flanged wheels C, said wheels being adapted to travel upon tracks D, which are secured to the side edges of a shallow recess or pit a short distance to the rear of the take-up mechanism.

As my device has no particular reference to any special form of take-up, but is equally well adapted for use in connection with the various take-up carriages in common use, I have not illustrated in the present case the take-up mechanism, the construction and operation of which is fully understood by those skilled in the art.

E is a heavy block of metal or other suitable weight, which is suspended in the recess or pit at the rear end of the car A by means of the rods F and F', as shown. One end of each of the rods or levers F is journaled upon a fixed shaft G, while the opposite ends of said rods are journaled upon the extended ends of the stub-shafts H, which project for a short distance beyond the side edges of the weight E near its forward end, as is clearly shown in Fig. 2 of the drawings. The rods F' are journaled at their rear ends upon the shafts I, which shafts are mounted within fixed bearings I', securely bolted to the transverse beam K, secured across the rear end of the pit, as shown. The opposite ends of the rods F' are journaled upon the extended ends of the stub-shafts H', which extend from the side edges of the weight E adjacent to its rear end.

Provision is had for lubricating the bearings by means of oil-cups $a$, and when additional weight is required metallic plates $E^2$ may be placed upon the upper face of the weight E, as shown in the drawings.

The operation of the device and its advantages over the old method of suspending a weight vertically from a pulley are obvious. It will be at once seen that the tension of the cable will depend entirely upon the position of the weight with reference to the car. The higher the weight may be raised by the forward movement of the car the more powerful its effect will be upon the cable, owing to the more direct rearward pull imparted through the car, and it will be also readily seen that, owing to the system of toggle-leverage which is employed, the effect of the weight upon the car, though at all times constant, will vary in force, according as the weight is raised or lowered. When for any cause the cable becomes slack, the car A will be drawn backward by the force of the weight E as imparted through the rods F F', the power or strain being immediately transmitted to the tension-carriage by the take-up cable L, connecting with the evener M, which is pivoted to the front end of the car A. When the cable is paying out or becomes taut, the car A will be moved forward by the force imparted thereto by the cables L, which will serve to raise the weight E and gradually increase the resistance or rearward pull, thus serving at all times to maintain an equalized tension upon the cable.

Having thus described my invention, what I claim to be new, and desire to secure by Letters Patent, is—

The herein-described improvement in mechanism for automatically regulating the tension of cables in cable-railway systems, the same comprising, in combination with the cable and the take-up mechanism, a car, connections between the car and the take-up mechanism, the weight E, the rods F, pivoted at one end to the car and at their opposite ends pivoted to the weight, and the rods F', pivoted at their forward ends to the weight and at their opposite ends pivoted to a fixed support, substantially as and for the purpose described.

In testimony whereof I affix my signature in presence of two witnesses.

WILLIAM B. UPTON.

Witnesses:
    JAMES H. GROVE, Jr.,
    MERRITT E. DOOLITTLE.